April 25, 1933.  C. S. REID  1,905,502
FROST CONTROL MACHINE
Filed Oct. 31, 1931  3 Sheets-Sheet 2

Chauncey S. Reid
INVENTOR
BY Victor J. Evans and Co. ATTORNEY

Patented Apr. 25, 1933

1,905,502

UNITED STATES PATENT OFFICE

CHAUNCEY S. REID, OF BROWNSVILLE, TEXAS

FROST CONTROL MACHINE

Application filed October 31, 1931. Serial No. 572,400.

The invention relates to a frost control machine and more especially to a temperature moderator or regulating device for plant or tree areas.

The primary object of the invention is the provision of a device of this character wherein air over a determined area, for example an orchard, can be agitated for the circulation thereof and such air heated so as to eliminate frost which would result in damage to the growing plants or the orchard.

Another object of the invention is the provision of a device of this character, wherein the construction thereof is novel in form so that when the same is in operation it will agitate or set up air currents in the atmosphere about a prescribed area, more especially in orchards or plant bearing areas, it being a well known fact that frost only occurs in still weather and when moisture in the air is prevalent, so that by circulating the still air and supplying heat thereto the frost will be dissipated so as to relieve any possibility of damage therefrom to the growing plants or trees.

A further object of the invention is the provision of a device of this character which is comparatively simple in construction, thoroughly reliable and efficient in its operation, and inexpensive to manufacture and install.

With these and other objects in view, the invention consists in the features of construction, combination and arrangement of parts as will be hereinafter more fully described in detail, illustrated in the accompanying drawings, which disclose the preferred embodiment of the invention, and pointed out in the claim hereunto appended.

In the accompanying drawings:—

Similar reference characters indicate corresponding parts throughout the several views in the drawings.

Figure 1:
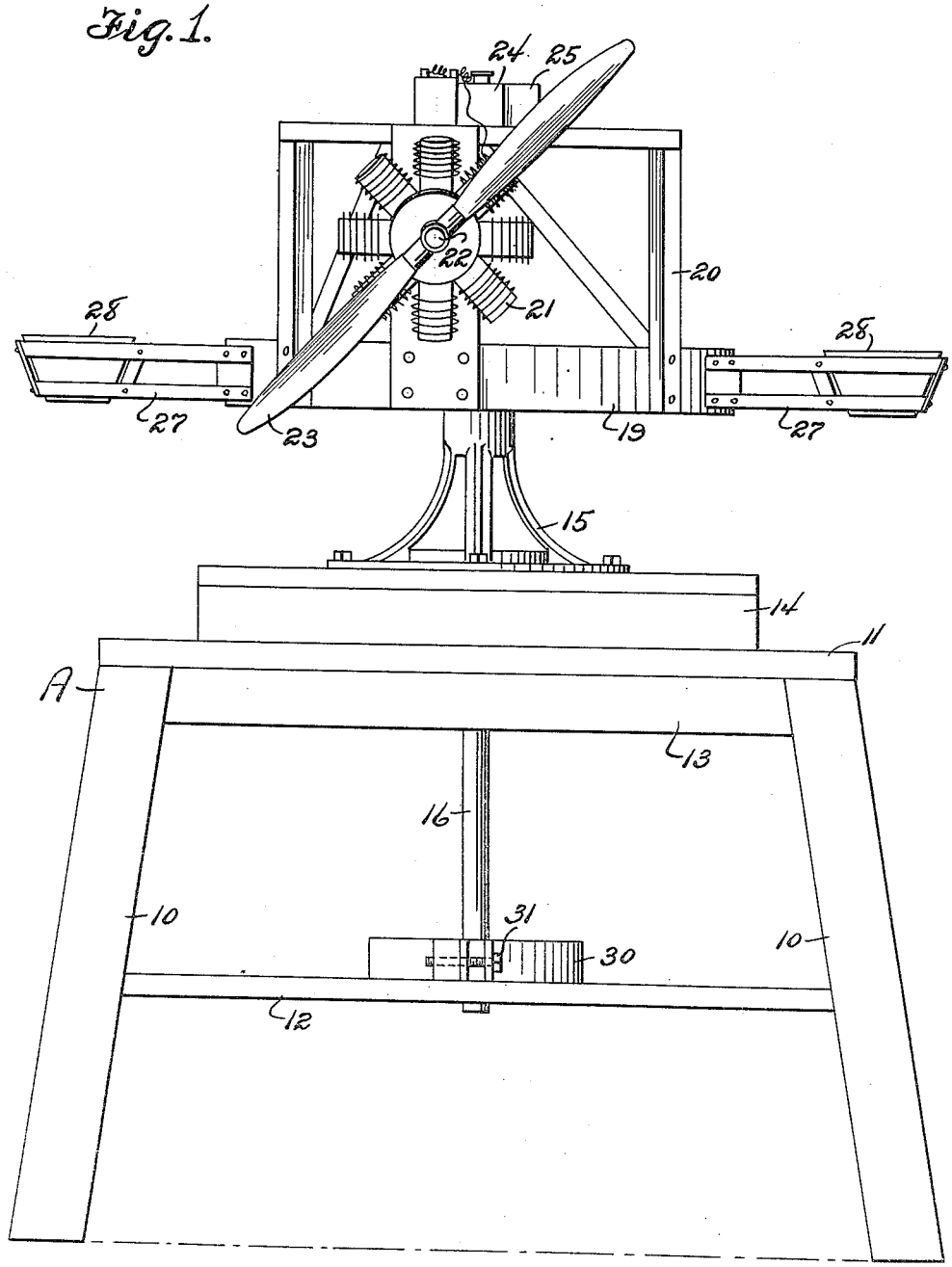
Figure 1 is an elevation of a machine or device constructed in accordance with the invention.
Figure 2:
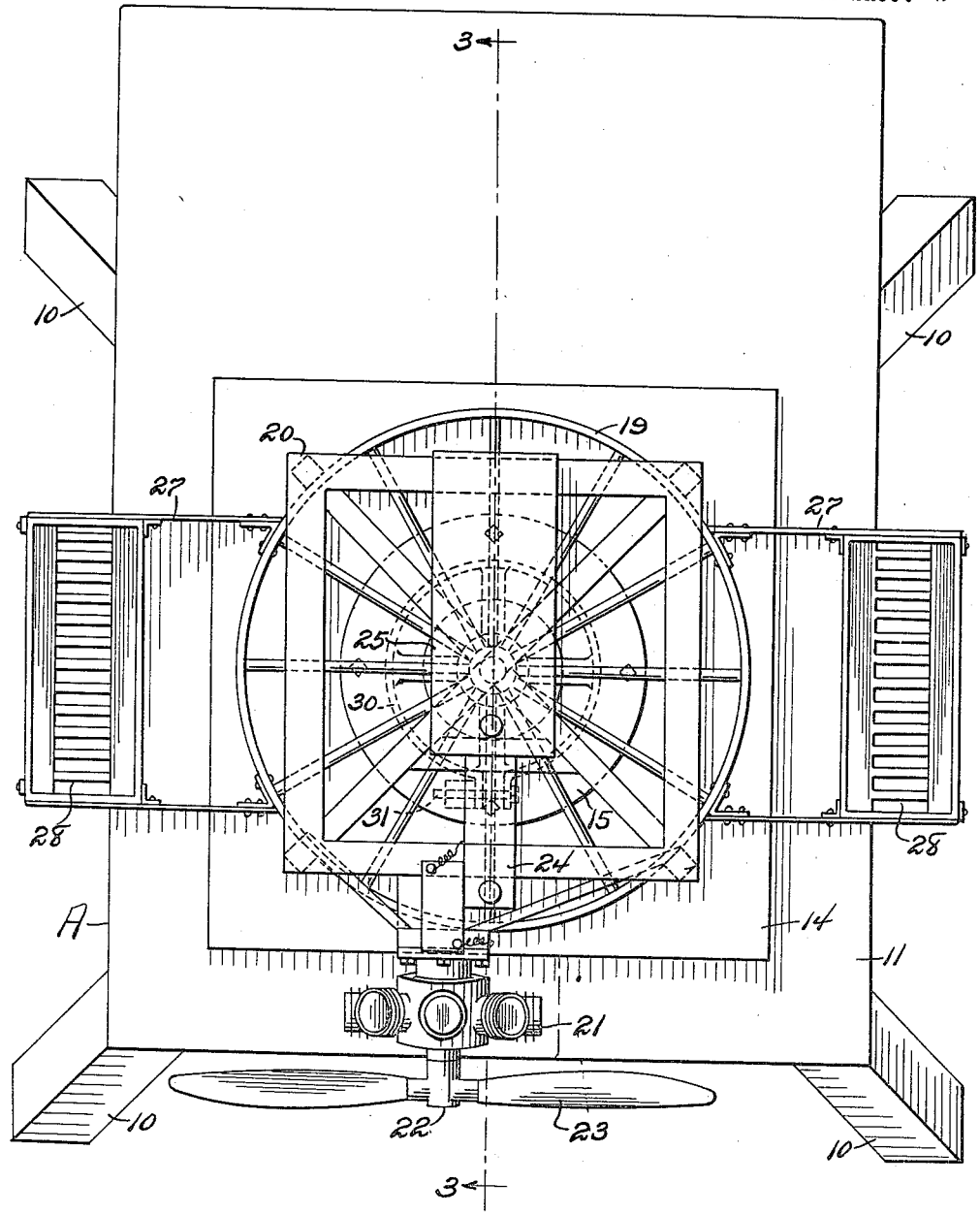
Figure 2 is a top plan view thereof.
Figure 3:
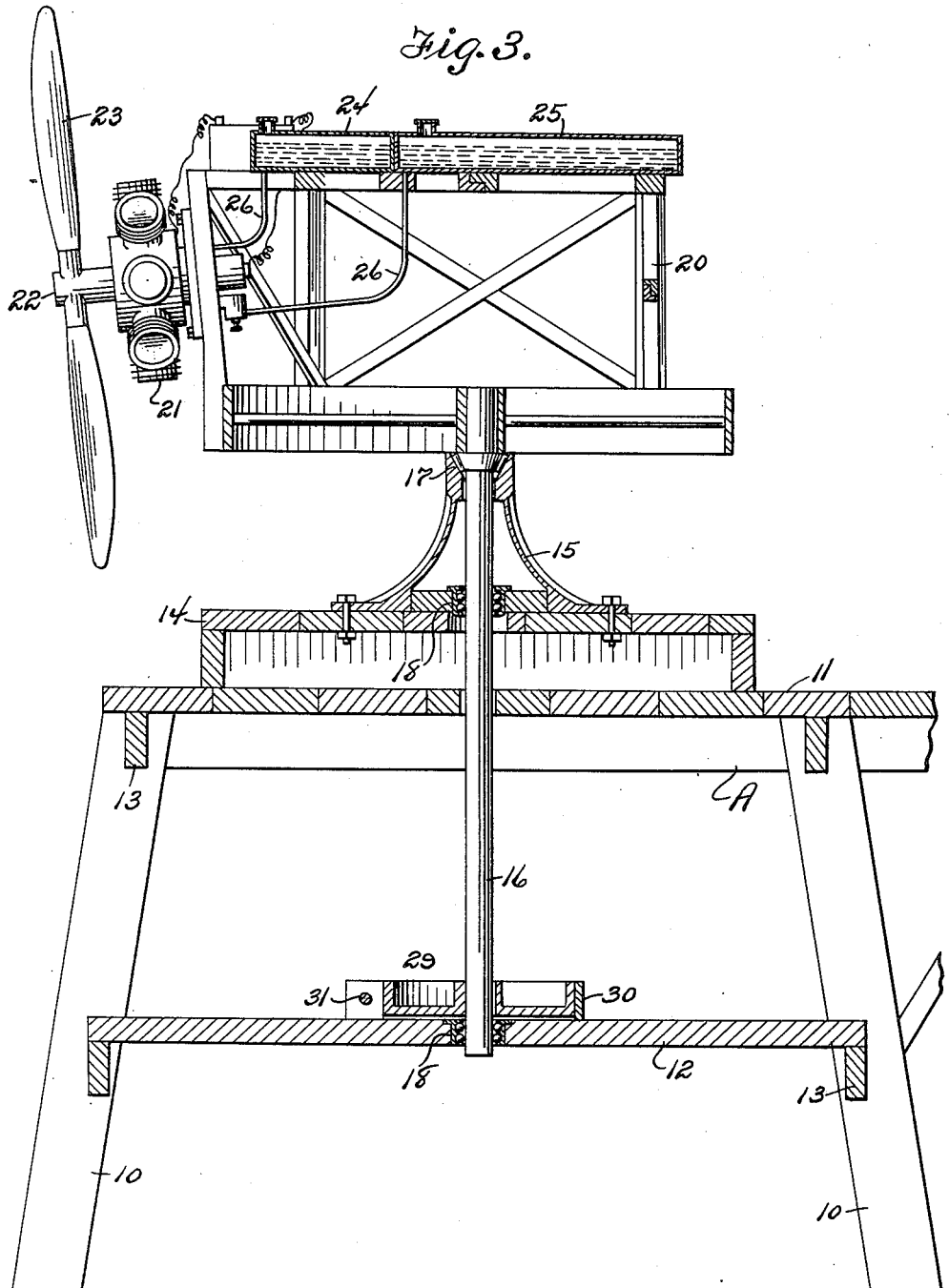
Figure 3 is a sectional view taken on the line 3—3 of Figure 2 looking in the direction of the arrows.

Referring to the drawings in detail the machine or device constituting the present invention comprises a tower A of the required height, having the legs 10 upwardly converging and resting upon the ground of a plot or area as may be selected, such as an orchard or plant growing field or the like. This tower A has a bordered top 11 and a sub-platform 12, these being supported upon suitable frames 13 provided in said tower. The top 11 of the tower has provided centrally thereof a bed 14 and arranged upon this bed is a center pedestal 15 in which is journaled a vertical shaft or axle 16, the pedestal being equipped with bearing rollers 17 while the bed 14 and likewise the sub-platform 12 carry bearing balls 18 for the said shaft or axle 16 to minimize friction in the rotation thereof.

The upper end of the shaft or axle 16 has suitably fixed thereto a spoked wheel 19 rotatable in a horizontal plane and upon this wheel is arranged a stand 20 having fitted therein to one side of the axis of the shaft or axle 16 an airplane motor 21, the same being so mounted as to have its propeller shaft 22 slightly inclined, whereby the propeller 23 will be tilted in the direction of the ground for the sending of air currents thereto.

The stand 20 has arranged thereon oil and gas supply tanks 24 and 25 for the motor 21, the supply being fed thereto through leads 26 from the respective tanks.

The motor 21 is preferably of the air-cooled type and is of any standard construction. The offsetting of the propeller shaft 22 of the motor 21 to one side of the axis of the shaft or axle 16 for the wheel 19 will cause the said wheel 19 to rotate in one direction when the motor 21 is operating and the propeller 23 will cause an air blast, preferably in a direction away from the wheel 19 and toward the ground so that the warm air present above the ground will be agitated and directed to the ground in the operation of the machine.

Mounted upon the wheel 19 at opposite sides thereof are suitable hanger frames 27, these carrying fuel grates or boxes 28 in which are adapted to be built fires so that the atmosphere about the device will become heated from such fires and the still air warmed or heated with resultant agitation thereof in this condition by the propeller as when the motor 21 is operating.

It will be clearly apparent that the still air prevailing about the device when in operation and this air when chilled will become heated by the device and agitated, while the propeller 23 will send the warmed or heated air in the direction of the ground or earth and thus the circulation thereof close thereto will eliminate frost and thus prevent damage therefrom to plants or trees for a determined or given area.

The axle or shaft 16 carries a brake drum 29 which is arranged close to the sub-platform 12, while the latter has suitably supported thereby a brake band 30 which embraces and cooperates with the drum 29, the band being set through the medium of an adjusting member 31 to regulate the braking action and in this way the speed of rotation of the wheel 19 will be controlled.

It will be apparent that the propeller 23 has its axis of rotation disposed laterally at one side of the axis of movement of the wheel 19 and this disposition of the motor will rotate the said wheel in one direction causing the said motor to throw an air stream in a circular path corresponding to the rotation of the wheel. This will cause an artificial air circulation over a large territory and such circulation will avoid frost damage to growing plants or trees within said area.

It is of course to be understood that the invention constituting the subject matter of this application is not to be restricted to the construction hereinbefore described, as it is contemplated to make changes, variations and modifications as come properly within the scope of the appended claim without departing from the spirit of the invention or sacrificing any of its advantages.

What is claimed is:—

In a machine of the character described, a stand constituting a tower and having a top and subplatform, a pedestal carried by the top, a vertical shaft journaled in the pedestal and in said subplatform, a wheel fixed to the upper end of the shaft and rotatable in a horizontal plane, a motor operated propeller supported by the wheel and having its axis disposed to one side of the axis of rotation of the wheel and inclined away from the plane of the latter, a brake having its parts carried by the subplatform and shaft and manually set.

In testimony whereof I affix my signature.

CHAUNCEY S. REID.